United States Patent
Blumstein-Koren et al.

(10) Patent No.: US 8,854,474 B2
(45) Date of Patent: Oct. 7, 2014

(54) SYSTEM AND METHOD FOR QUICK OBJECT VERIFICATION

(75) Inventors: Guy Blumstein-Koren, Tel Mond (IL); Raanan Yonatan Yehezkel, Kiryat Ekron (IL)

(73) Assignee: Nice Systems Ltd., Raanana (IL)

( * ) Notice: Subject to any disclaimer, the term of this patent is extended or adjusted under 35 U.S.C. 154(b) by 519 days.

(21) Appl. No.: 13/042,483

(22) Filed: Mar. 8, 2011

(65) Prior Publication Data

US 2012/0229629 A1 Sep. 13, 2012

(51) Int. Cl.
*G06K 9/32* (2006.01)
*G06F 17/30* (2006.01)

(52) U.S. Cl.
CPC .................................. *G06F 17/3079* (2013.01)
USPC ........................ 348/169; 348/208.14; 382/103

(58) Field of Classification Search
CPC .... H04N 7/18; G06K 9/00624; G06K 9/3241
USPC ............................... 348/169, 208.14; 382/103
See application file for complete search history.

(56) References Cited

U.S. PATENT DOCUMENTS

| 6,043,837 | A  | * | 3/2000 | Driscoll et al. | 348/36 |
| 6,144,972 | A  | * | 11/2000 | Abe et al. | 715/205 |
| 6,711,590 | B1 | * | 3/2004 | Lennon | 1/1 |
| 6,970,183 | B1 | * | 11/2005 | Monroe | 348/143 |
| 8,341,152 | B1 | * | 12/2012 | Bates | 707/736 |
| 2003/0165193 | A1 | * | 9/2003 | Chen et al. | 375/240.08 |
| 2007/0053201 | A1 | * | 3/2007 | Dietz et al. | 362/559 |
| 2010/0157049 | A1 | * | 6/2010 | Dvir et al. | 348/143 |

* cited by examiner

*Primary Examiner* — Sath V Perungavoor
*Assistant Examiner* — Jeffery Williams
(74) *Attorney, Agent, or Firm* — Pearl Cohen Zedek Latzer Baratz LLP (57) ABSTRACT

Systems and methods for identifying an appearance of an object in a video stream, include receiving, in real-time, an indication of an area of interest, from a user, within a frame of a video stream. The area of interest may include an image of an object. Automatically analyzing the characteristics of the area of interest, finding a frame in which the object first appears in time in the video stream and displaying to the user the video stream starting from the frame in which the object first appears.

12 Claims, 5 Drawing Sheets

SYSTEM AND METHOD FOR QUICK OBJECT VERIFICATION

FIELD OF THE INVENTION

Embodiments of the invention relate to identification of static objects using video analysis solutions.

BACKGROUND

Video Content Analysis (VCA) or video analytics are common names for automatic analysis of a video stream in order to detect or identify points of interest within the video stream. Video analytics is becoming more prevalent in a wide range of domains such as security, entertainment, health care and surveillance. Video analytics applications that aim to detect a static object in a video stream suffer from severe degradation of performance when working in crowded environments. Recently, many vendors of video solutions have tried to develop various applications to detect static objects in crowded areas; however, these applications for automatic detection of static objects had produced high number of false alarms and were practically ineffective. On the other hand there are some existing solutions which include manually searching of objects using reverse playback. Such solutions are usually inconvenient, tedious and time consuming.

Recently, an approach of increasing the public awareness to existence of suspicious objects and developing methodologies to handle them promptly has become more popular.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification and claims to describe two or more components, devices, elements, units, parameters, or the like. For example, "a plurality of devices" may include two or more devices.

Although embodiments of the invention are not limited in this regard, the term "camera" as used herein may be used throughout the specification and claims to describe any device or component able to capture and/or record any type of data, such as, video data, still images data, audio data and the like.

Some embodiments of the invention may be implemented, for example, using an article including or being a non-transitory machine-readable or computer-readable storage medium, having stored thereon instructions, that when executed on a computer, cause the computer to perform method and/or operations in accordance with embodiments of the invention. The computer-readable storage medium may store an instruction or a set of instructions that, when executed by a machine (for example, by a computer, a mobile device and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Figure 1:
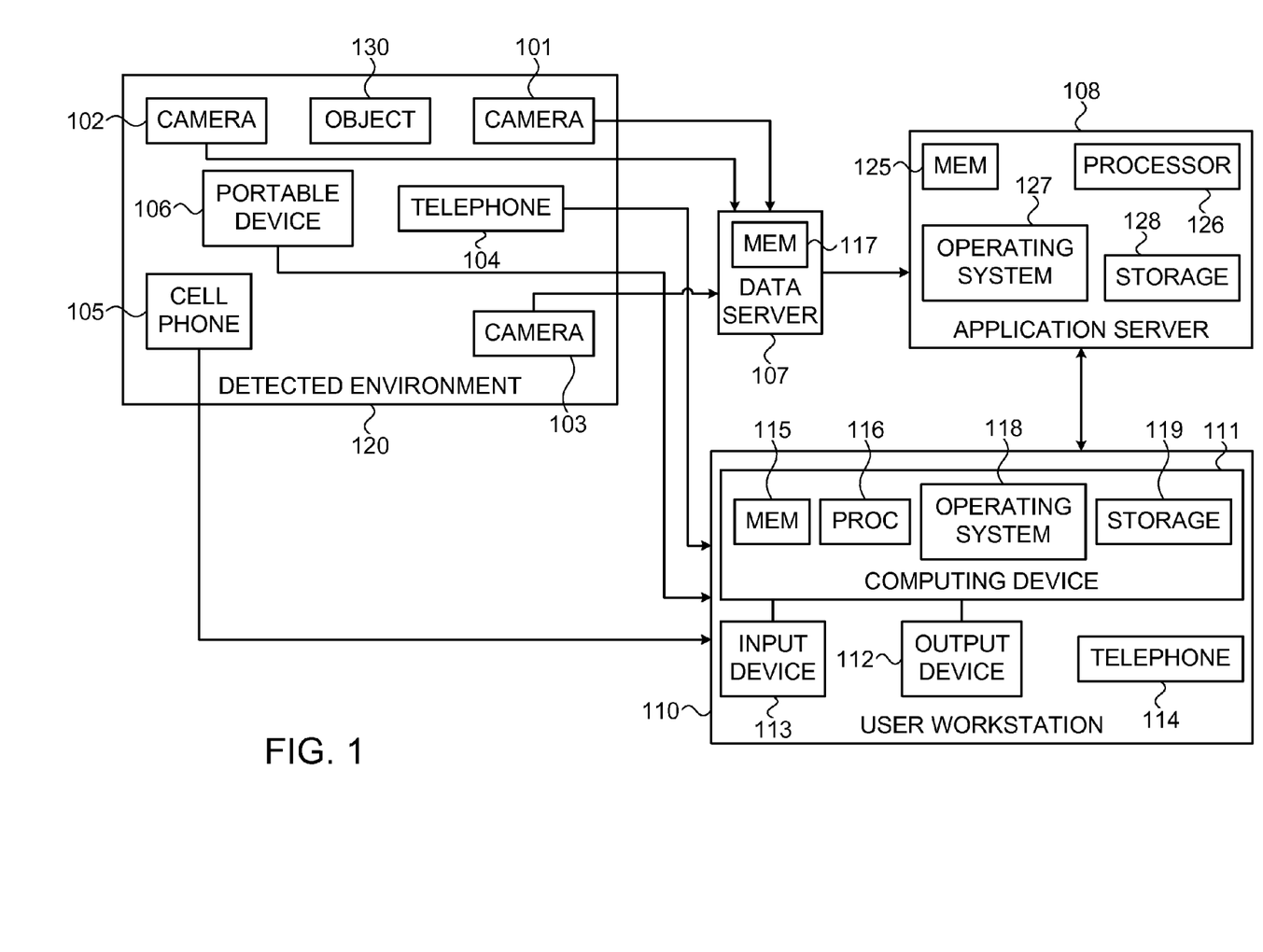
FIG. 1 is a high-level block diagram of a video analytics system according to embodiments of the present invention.

Reference is now made to FIG. 1, which is a high-level block diagram of a video analytics system according to embodiments of the present invention. Video analytics system 100 may include one or more cameras 101, 102 and 103 placed, located or positioned in a monitored environment or to capture or view a monitored scene or environment 120 and connected to or integrated with a data server 107. Monitored environment 120 may be any real-world environment which may require video based quick detection or investigation applications, such as for example, an airport, a train station, parking area, shopping mall and the like. Throughout the specification, monitored environment 120 is presented as an airport environment for simplicity and clarity of illustration only, and it should be understood that the scope of the present invention is not limited in this respect.

System 100 may include one or more communication elements 104, 105, 106 and a user workstation 110 connected to or integrated with an application server 108. Communication elements 104, 105 and 106 may allow a person present at monitored environment 120 to notify a user of the system, e.g., a user operating workstation 110, regarding a specific event, object or item, such as, for example, an abandoned or suspicious object, in monitored environment 120. Although the invention is not limited in this respect, communication elements 104-106 may include, for example, a landline telephone 104, a cellular telephone 105 any other portable communication device 106 such as, a laptop a smart phone, a personal digital assistant (PDA) and the like. It should be understood to a person skilled in the art that any other kind, type or form of a communication element which may enable notifying a user workstation may be used.

Monitored environment 120 may be monitored by one or more of cameras 101, 102 and 103 which may be, for example, a closed-circuit television system (CCTV). Video stream data including a series of images captured, e.g., digitally (although analog capture may be used), by one or more of cameras 101, 102 and 103 may be transferred to data server 107. Data server 107 may be used for storing data, e.g., video data received from cameras 101, 102 and 103 or any other data related to the video stream. The video stream may be digitally stored in data server 107. In some embodiments of the present invention, data server 107 may be located externally to application server 108 while in other embodiments data server 107 and application server 108 may be implemented as a single server or system. Data server 107 may include a memory unit 117 which may be any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like.

User workstation 110 may include one or more telephone devices 114, one or more computing devices 111 connected to one or more output devices 112 and user input devices 113. User workstation 110 may include any other communication devices and/or computing devices or other equipment for in an operating or a control room. According to embodiments of the present invention, computing device 111 may include a memory 115, a processor 116, an operating system 118 and a storage unit 119.

Processor 116 may be, for example, a central processing unit processor (CPU), a chip or any suitable computing or computational device. Operating system 118 may be or may include any code segment designed and/or configured to perform tasks involving coordination, scheduling, arbitration, supervising, controlling or otherwise managing operation of computing device 111, for example, scheduling execution of programs. Memory 115 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 115 may be or may include a plurality of, possibly different memory units. Memory 115 may include executable code, e.g., an application, software, a program, a process, task or script. The executable code may be executed by processor 116 possibly under control of operating system 118. Storage 119 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Input devices 113 may be or may include a mouse, a keyboard, a touch screen or pad or any suitable input device. It will be recognized that any suitable number of input devices may be operatively connected to computing device 111. Output devices 112 may include one or more displays, monitors, speakers and/or any other suitable output devices. It will be recognized that any suitable number of input devices and/or output devices may be operatively connected to any number of computing devices 111. Any applicable input/output (I/O) devices may be connected to computing device 111. For example, a network interface card (NIC), a printer or facsimile machine, a universal serial bus (USB) device or external hard drive may be included in input devices 113 and/or output devices 112.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 115 and a processor such as processor 116.

In some embodiments of the invention, user workstation 110, e.g., computing device 111, may receive in real-time a notification regarding a suspicious or abandoned object 130 existing in monitored scene 120 from an observer e.g., a passenger passing by, a security personnel or a person present at the monitored scene that may notice a suspicious object. User workstation 110 may notify a user, operating workstation 110, for example, an operator in a control room, regarding the received notification. The notification regarding abandoned object 130, e.g., an abandoned item of luggage located in monitored environment 120, may be received at workstation 110 or at computing device 111 via one of communication devices 104-106 or from an automated system. In other embodiments of the invention, a user, operating workstation 110, may receive in real-time a notification regarding suspicious object 130 existing in monitored scene 120 from an observer and may enter the alert or notification to user workstation 110, e.g., to computing device 111 by using input device 113.

Figure 5:
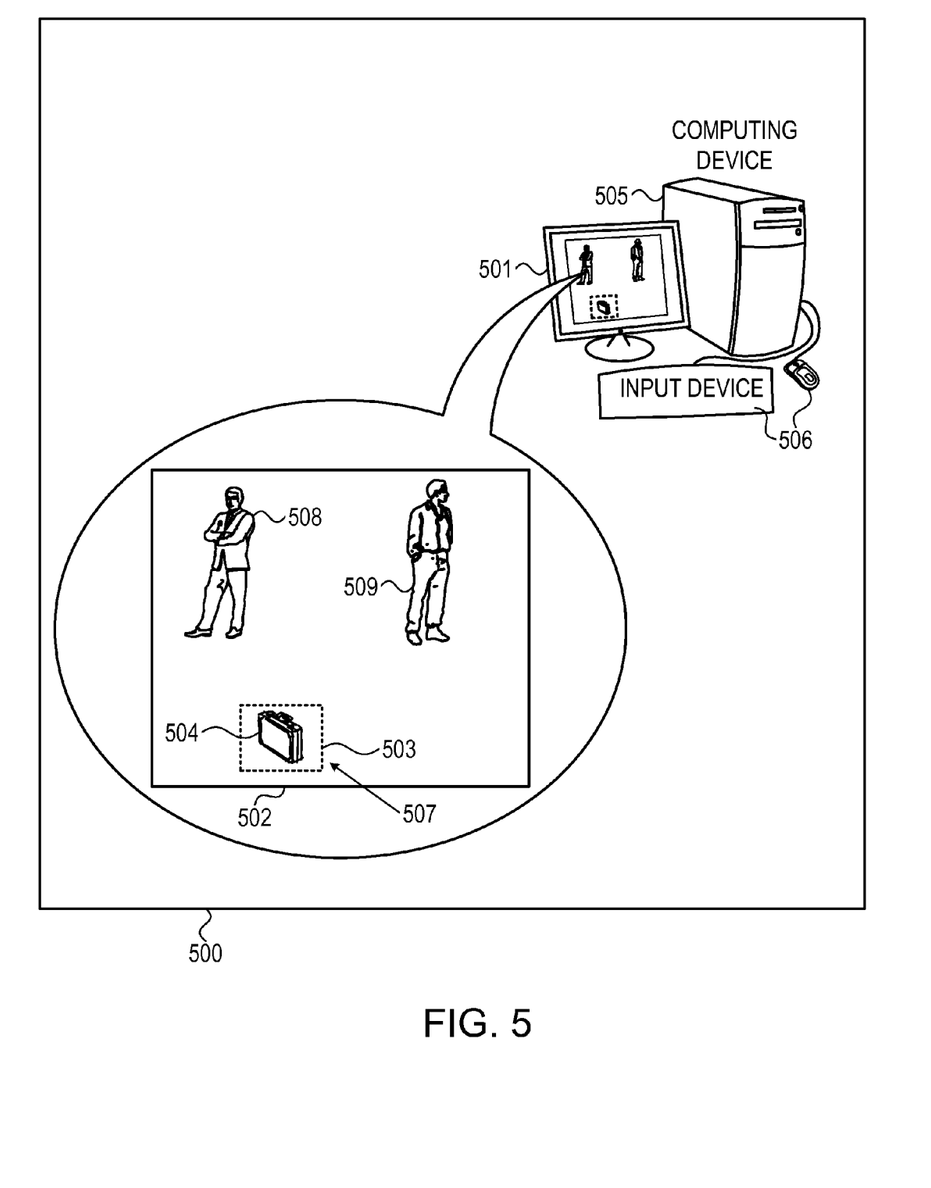
FIG. 5 is a representation of an area of interest.

After receiving the notification, the user may define or indicate an area of interest (AOI) around an image of the detected object as it appears in one frame of a video stream as shown in FIG. 5. Reference is now made to FIG. 5, which is a representation of system and an AOI. According to embodiments of the invention, a user workstation 500, e.g., user workstation 110 of FIG. 1 may include a computing device 505 connected to an input device 506 and to an output device such as a display, a monitor or a screen 501. User workstation 500 may include other components and units, e.g., as shown in FIG. 1. Screen or monitor 501, e.g., output device 112 of FIG. 1, may display video data or video frames.

A user, operating user workstation 500 may select a frame 502 of a video stream in which a monitored scene 507 is presented. Monitored scene 507 may image a real world environment, e.g., monitored environment 120 of FIG. 1. Monitored scene 507 may be a scene in a video stream that represents real world objects. A user may set, create, define or characterize an AOI 503 around or including an image (or part of an image) of a detected object 504 in monitored scene 507. The user may use input device 506 in order to create AOI 503 for example by drawing or wrapping a box, window, circle or any other closed line or suitable shape around detected object 504 as it appears in one frame of a video stream. A closed line need not be used. The workstation 500 may receive a definition or an indication of an AOI, and define or indicate an AOI, via the user using input device 506. AOI 503 may mark detected object 504 leaving other images of objects in the frame, e.g., object 508 and object 509, out of AOI 503 (depending on the precision of the AOI, other objects may be within the AOI). Input device 506 may include for example, a mouse or any other pointing device. Other methods of defining, indicating or setting an AOI containing a detected object may be used. Setting an AOI may be performed by using, for example, a dedicated graphical user interface (GUI) at user workstation 500. The AOI may be set in real-time within frame of the video stream by a user of a control system or a control room, e.g., user workstation 500.

Reference is made back to FIG. 1. After defining an AOI a query may be sent from computing device 111 to application server 108. Application server 108 may include for example a memory 125, a processor 126, operating system 127 and a storage unit 128. Processor 126 may be, for example, a central processing unit processor (CPU), a chip or any suitable computing or computational device. Operating system 127 may be or may include any code segment designed and/or configured to perform tasks involving coordination, scheduling, arbitration, supervising, controlling or otherwise managing operation of application server 108, for example, scheduling execution of programs. Memory 125 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 125 may be or may include a plurality of, possibly different memory units. Memory 125 may include executable code which may be any executable code, e.g., an application, software a program, a process, task or script. The executable code may be executed by processor 126 possibly under control of operating system 127. Storage 128 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Application server 108 may receive a query from computing device 111, including an indication of an AOI, and may issue a request for reverse playback from data server 107. Application server 108 may analyze the query by analyzing, reviewing or scanning the video sequence back in time (e.g., by analyzing characteristics of frames or objects), or by scanning prior video frames, to find the time, video portion or frame in which the object had first appeared (in time running forward, assuming the frames are ordered in time) in the AOI as described with reference to embodiments of the invention. Scanning back may mean automatically analyzing from the current point in time backwards, or may include analyzing prior video frames starting back in time, or in any sequence. After automatically finding the specific time (or the specific frame) at which the object had first appeared in time in the video stream, the video may be played back for the user using output device 112, e.g., from data server 107, starting just before the moment of object appearance. After automatically finding the frame or time in which the object first appears in time in the video stream the video stream may be displayed to the user starting from the frame in which the object first appears in the video stream or from a frame previous in time to this frame. A user may decide or may predetermine whether the video stream may be displayed from the frame in which the object first appears in the video stream or from a frame previous in time to this frame.

Based on the presented video a user, e.g., a security worker may easily, quickly and on the fly investigate and understand the circumstances which lead to the detected event or object. For example the actions leading to the placing or abandoning of an object may be viewed. These circumstances may serve as a key factor in making an operational decision, for example, setting the level of threat and as a result, in deciding whether to evacuate the terminal.

Although in the exemplary illustration of FIG. 1, three cameras 101, 102, 103, three communication elements 104-106 and one data server 107 are shown, it should be understood to a person skilled in art that the invention is not limited in this respect and according to embodiments of the present invention, system 100 may include any suitable numbers or forms of cameras, communication elements and data servers.

According to embodiments of the present invention, user workstation 110 and application server 108 may each include or may be, for example, a personal computer, a desktop computer, a mobile computer, a laptop computer, a notebook computer, a terminal, a workstation, a server computer, a Personal Digital Assistant (PDA) device, a tablet computer, a network device, a mobile phone, a household appliance or any other suitable computing device. Each of workstation 110 and application server 108 may include components such as, but not limited to, a plurality of central processing units (CPU) or any other suitable multi-purpose or specific processors or controllers, a plurality of input units, a plurality of output units, a plurality of memory units, and a plurality of storage units. Workstation 110 and application server 108 may additionally include other suitable hardware components and/or software components.

Figure 2:
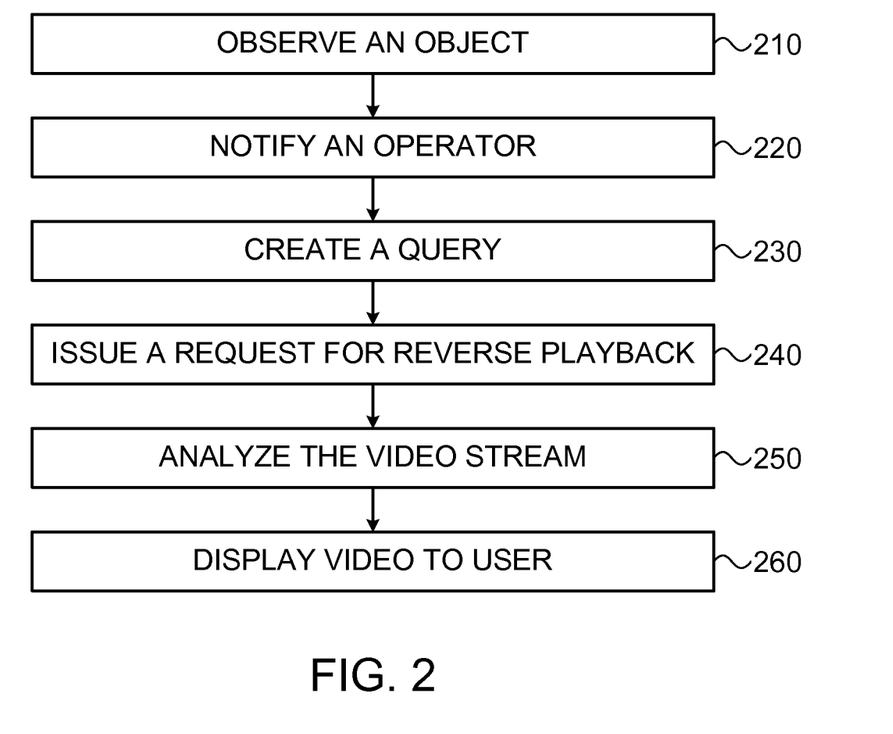
FIG. 2 is a flowchart of a method of quick object verification according to embodiments of the present invention.

Reference is now made to FIG. 2, which is a flowchart of quick object verification according to embodiments of the present invention. The method may include identifying an appearance of an object in a video stream and operations of the method may be implemented, for example, using system 100, by one or more of the elements in system 100, e.g., data server 107, application server 108, communication elements 104-106, workstation 110, cameras 101-103 and/or by other suitable units, devices, and/or systems.

As indicated at box 210, a person, e.g., a passenger passing by or security personnel may observe, detect or notice a suspicious or abandoned object, also referred to herein as "the detected object", in a real-world monitored scene or environment, e.g., monitored environment 120 of FIG. 1. A typical monitored scene may, for example, be an airport terminal, a train station, a parking area or any other monitored environment. The monitored environment may be monitored by cameras, such as CCTV cameras. The video stream captured at monitored environment 120 may include a monitored scene, e.g., a scene in the video which images the real-world environment 120. The detected object may be an object located in the real-world monitored environment which a person may view directly in the real world and it may appear at a monitored or detected scene which is an image in a video imaging the real world.

As indicated at box 220, an observer may notify a user of the system, e.g., an operator in a control room, regarding the detected object by, for example transferring a message to a computing device at a user workstation. Embodiments of the invention may include receiving in real-time a notification regarding an object existing in a monitored scene, for example, the user may receive the notification via a communication channel. An observer may deliver the notification by a communication element such as, for example, a landline phone, a cellular phone, a personal computer, e.g., communication elements 104-106 of FIG. 1.

As indicated at box 230, the user may create a query regarding the detected object to an application server, e.g., application server 108 of FIG. 1. The user may pause the video stream and may look at a frame of a video stream in which he may recognize the detected object notified by the observer and may create a query requesting for example a quick playback from the moment the object was first placed at or in the scene. The real time video stream may be paused and the user may be able to view the stream in a frame-by-frame manner in order to select the frame in which the object is highly visible, or more visible than in other frames. The query may include definitions, parameters and information related to the detected object, for example, the relevant scene's field of view as defined by camera name or a channel number, an indication of an AOI around the detected object defined by the user within the field of view and a time stamp of the frame on which the AOI may be defined and in which the detected object may fully or clearly may appear.

The user may set, create, indicate, define or characterize an AOI around a detected object within a frame of a video stream recorded at the monitored scene by, for example, drawing or wrapping a box, window, circle or any other closed line around the detected object as appear in one frame of a video stream. The AOI includes an image of the object. Any other method of setting an AOI containing the detected object may be used. Setting an AOI may be performed by using, for example, a dedicated graphical user interface (GUI) at a user workstation, e.g., workstation 110 of FIG. 1.

As indicated at box 240, the method may include issuing, by an application server, e.g., application server 108 of FIG. 1, a request for reverse playback from a data server in which recorded video streams of the monitored environment may be saved, e.g., data server 107 of FIG. 1. According to embodiments of the invention, the request may point to the relevant channel as may appear in the query set at box 230. The recorded video may be streamed, e.g., as a compressed video stream from the data server to the application server. An application server, e.g., application server 108 of FIG. 1, may perform an efficient decompression by selecting a limited AOI or by selecting a subset of the frames for decompression e.g., selecting only intra frames in Motion Picture Expert Group (MPEG)-like streams, or selecting every $10^{th}$ intra frame. The application server may change decompression efficiency on the fly according to necessity, for example, to allow accurate feature extraction from the AOI as described in detail at box 250.

As indicated at box 250, the method may include analyzing the video stream delivered to the application server, in order to find the first appearance (e.g., the time, video portion or image frame) of the detected object. Analysis may include automatically analyzing the characteristics of the image or objects within the AOI within the queried frame or set of neighboring frames in the stream and scanning back the video stream to find a frame in which the object first appears in the monitored scene, based on the characteristics. Embodiments of the invention may use characteristics such as feature vectors and may extract a query feature vector, namely, an appearance feature. An appearance feature may represent characteristics of the object in the image based on a bitmap of the image, for example, colors, gradients and the like. The feature vector from the queried frame may be used for matching with a relevant area in previous frames in the video stream.

The video stream may first be decompressed, if needed, and may be analyzed by iteratively scanning the video sequence back in time starting from the moment the query was set and back in time in order to find the time in which the detected object may first appeared in the AOI based on the extracted query feature vector. Each image (or certain images, or each n'th image) may be analyzed (e.g., by having characteristics analyzed) by the application server, e.g., application server 108 of FIG. 1, and the same feature vector may be extracted from the relevant AOI. Each of the iterations may include image segment selection, feature vector extraction, a comparison between the extracted feature vector and the query feature vector until finding the moment the detected object first appeared in the video stream.

As indicated at box 260, the method may include displaying the video stream to the user of a control system from the frame the object first appears in the monitored scene, starting before the moment of object appearance and forward in time. The video may be played back and the user may investigate and understand the circumstances of the appearance of the object, e.g., the abandoning of the object which may be a key factor in setting the level of threat posed by the detected object and, as a result, in deciding whether to evacuate the area.

It should be understood to a person skilled in the art that other operations or sets of operations may be used in accordance with embodiments of the invention.

Figure 3A:
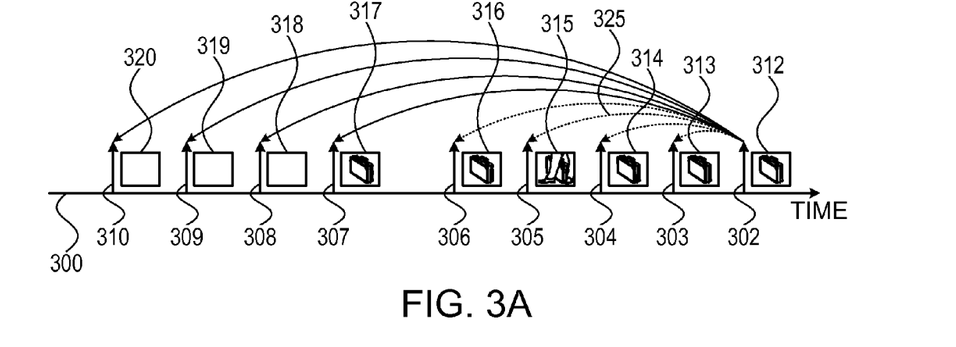
FIGS. 3A and 3B are representations of searching for and displaying a detected object according to embodiments of the present invention.
Figure 3B:
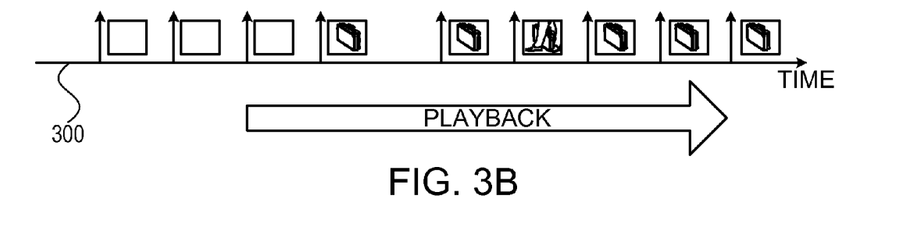

Reference is now made to FIGS. 3A and 3B, which are representations of searching and displaying a detected object according to embodiments of the present invention. According to embodiments of the invention, during analysis of the video stream indicated at box 250 of FIG. 2, a feature vector may be extracted from each detected frame, e.g., each intra frame, and compared to the query feature vector, which may be extracted from the queried frame, to measure appearance similarity.

FIG. 3A presents the searching process along horizontal axis 300 which represents time. At a given moment, represented by arrow 302, the system, e.g., an application server, may be provided with a query created by a user and transfer from a computing device of a user workstation including an AOI around a suspicious object 312. Arrows 303-310 may represent a subset of frames from a video stream, from the moment a query was set (arrow 302) and backwards in time, namely from right to left along axis 300. FIG. 3A represent a plurality of AOIs 313-320, each corresponds to a frame at a given moment of the video stream (represented by arrows 303-310). AOI 313 corresponds to time 303, AOI 314 corresponds to time 304, AOI 315 corresponds to time 305, AOI 316 corresponds to time 306, AOI 317 corresponds to time 307, AOI 318 corresponds to time 308, AOI 319 corresponds to time 309, and AOI 320 corresponds to time 310. Each of AOIs 313-320 may be analyzed, or may have the image area or objects within or defined by the AOI analyzed to extract the appearance features vectors or characteristics.

According to embodiments of the invention, the query feature vector extracted from AOI 312 may be compared to the feature vector extracted from AOI 313 at time 303. As illustrated in FIG. 3A, the comparison may yield a match between AOI 312 and AOI 313 and thus the search may continue as the object still appears in the scene. The comparison between AOI 312 and AOI 314 may also yield a match and thus the search may continue with the next frame (e.g., the next frame in sequence, such as a backwards sequence, or the next n'th frame in sequence) towards the third comparison at point 305, between AOI 312 and AOI 315. The third comparison in this example yields a mismatch due to an occlusion near the detected object, indicated by dotted line 325 connecting AOI 312 and AOI 315, however, the following comparison between AOI 312 and AOI 316 may yield a match and thus the search may continue.

Once a consistent mismatch is detected, e.g. detecting a first predefined number of mismatches in or over a second predefined number of consecutive (or consecutive when skipping a certain number of frames between analyzed frames) test frames, the system may stop the analysis and may return the result. If the search continues the query feature vector may be compared to the feature vector of a next frame in the direction of scanning. For example, the searching or analyzing process may continue backwards in time (e.g., with the "next" frame backwards in time in the series of frames) until a predefined number of mismatches between the feature vector of the test frames and the query feature vector occurs and then the analysis process may be stopped and the result may be presented to the user.

Although the invention is not limited in this respect, a predefined number of mismatches in a predefined number of consecutive test frames may correspond to the fact that the detected object may be absent at the test frames and the first detection of a mismatch may be reported as the closest moment to object appearance. As shown in the example in FIG. 3A, a predefined number, e.g., three mismatches, had occurred between AOI 312 and each one of AOI's 318, 319 and 320, and therefore a timestamp of the frame in which the first mismatch in the set of mismatches had occurred (AOI 320) may be returned by the system and the result may be presented as a video playback starting from this frame or from some time interval before this frame as illustrated in FIG. 3B.

FIG. 3B presents the displaying process along horizontal axis 300 which represents time. A predefined number of mismatches between a feature vector of a test frame and a query feature vector may be detected in a predefined number of consecutive test frames. This may correspond to the fact that the detected object may be absent in the test frames. Once such a predefined number of mismatches occur, the system may display the video stream playback to a user starting from this frame or from some time interval before that frame, as shown from left to right along axis 300 of FIG. 3B.

Although in embodiments of the invention a searching based on comparing feature vectors is presented, it should be understood to a person skilled in art that the invention is not limited in this respect and according to other embodiments of the present invention, any alternative searching process may be used, for example, binary search.

Figure 4:
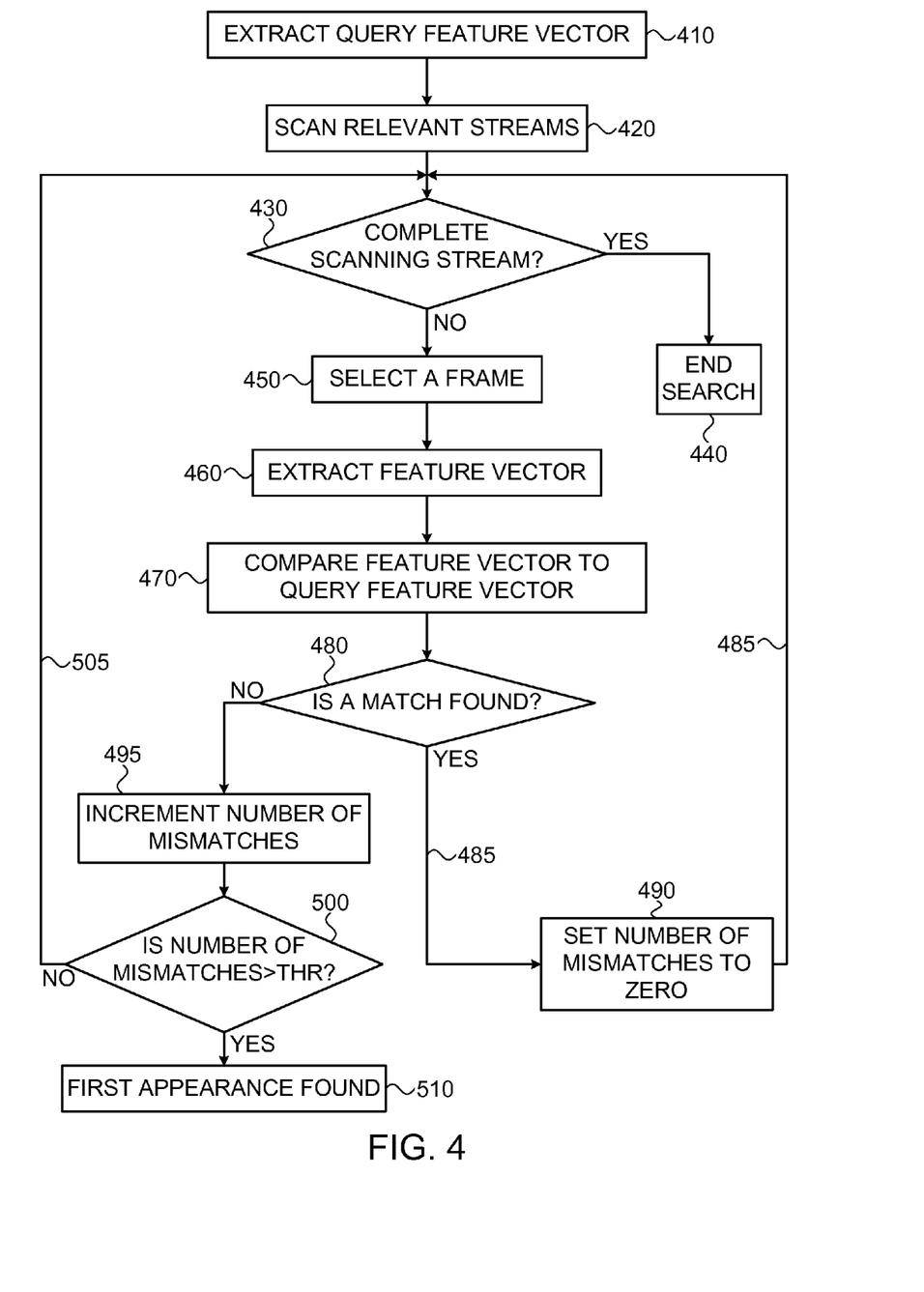
FIG. 4 is a flowchart representing video frames analysis according to embodiments of the present invention.

Reference is made to FIG. 4 which is a flowchart representing video frames analysis according to embodiments of the present invention. FIG. 4 is a more detailed description of the analysis process described at box 250 of FIG. 2. Operations of the method may be implemented, for example, using system 100, by one or more of the elements in system 100, namely, data server 107, application server 108, communication elements 104-106, workstation 110, cameras 101-103 and/or by other suitable units, devices, and/or systems.

As indicated at box 410, the analysis process may include extracting a query feature vector from an AOI which may be marked or defined within a queried frame, also referred to herein as "a first frame" by a user, e.g, an operator in a control room. The AOI may include an object, article or another entity which may require an observation or investigation, e.g., an abandoned object. The analysis of the AOI within a queried frame or image may be performed by an application server, e.g., application server 108 of FIG. 1. The extracted query feature vector may be or include any appearance features of the detected object from the AOI and it may be used for matching with relevant areas in other frames selected from a video stream, also referred to herein as "test frames". In some embodiments of the invention, appearance features, containing, for example, colors or gradients of the object bitmap, may be stored in the form of vectors of the measured values, a histogram or as a vector of statistical properties of the object bitmap such as mean and/or standard deviation. Any other form may be used to store the appearance vector.

As indicated at box 420, the analysis process may include scanning all relevant streams for finding a relevant stream which may include a frame or a plurality of frames having an area similar to the selected AOI. Similarity may be defined in terms of a distance metric between the query feature vector and the feature vector extracted from the stream. As each camera produces a stream of compressed video, the relevant stream or camera may be the one in which the suspicious object is observed in best conditions. When no overlap exists between the field of view of each of the plurality of cameras, only one relevant stream may exist.

According to some embodiments each camera has a different and non-overlapping field of view, therefore only one relevant stream per a certain location may exist. In other embodiments where an overlap between cameras may exist, e.g., more than one camera covers a certain area, the system may scan the video stream of another camera as well.

As indicated at box 430, a check of whether the relevant stream has been scanned may be performed. If the relevant stream has been scanned the analysis process may end as indicated at box 440. In case the scanning process of the relevant stream is not completed, the analysis process may include selecting a frame from the relevant video stream for the search process as indicated at box 450. It should be understood that the check of whether the relevant stream has been scanned may include a check of whether the entire stream or a part of the stream has been scanned. For example, after drawing an AOI on a frame recorded at a certain time, a user may decide to search backward for a time period (e.g. one hour). In this case the process in box 430 may verify that the search does not exceed the search limit.

In some embodiments, selecting all frames or selecting only a plurality of frames from the video stream may be performed. Exemplary selecting process may include a binary search or a linear scan, e.g., using all intra frames in MPEG-Like streams or decompressing every, for example, $10^{th}$ INTRA frame. Any other frame or image selection process may be used. According to embodiments of the invention, selecting a frame may further include a selection of a certain or specific segment from the selected frame, e.g., an AOI. In some embodiments "smart extraction" may be used. Instead of the whole frame, only part of the frame may be decompressed in order to analyze only the relevant area in the image.

As indicated at box 460, the analysis process may include extracting a feature vector from the AOI of a plurality of frames of the video stream. According to embodiment of the invention, each of the decompressed image segments selected at box 450 may be analyzed and the same feature vector may be extracted from the relevant AOI.

According to some embodiments of the invention, the selected image segment may be divided into overlapping blocks and features (e.g. appearance features) of each block may be extracted. Features may include a histogram of oriented gradients (HOG), Haar-like features and the like. The features of the blocks may be grouped into the query feature vector. Exemplary feature vectors may include, for example, the region covariance of the entire image segment or stacked features of key-points in the image segment. It should be understood to a person skilled in the art that the invention is in no way limited in this regard and any other feature vector may be used in other embodiments of the invention. In addition this description related to extraction of a feature vector is relevant to some embodiments of the extraction of the query feature vector indicated at box 410.

Although the invention is not limited in this respect, in order to allow accurate feature vector extraction from an AOI, an application server, e.g., application server 108 of FIG. 1 may change decompression efficiency on the fly according to necessity.

As indicated at box 470, the analysis process may include comparing the query feature vector to the feature vector of each of the plurality of frames in order to measure appearance similarity. Exemplary similarity measures may include histogram intersection or Bhattacharyya distance for HOG and Haar-like features, or geodesic distance on a Riemannian manifold on which covariance matrices may lie for region covariance features.

As indicated at box 480, the analysis process may include determining whether a mismatch exists between the first frame and each one of the plurality of frames. A check whether a match between the feature vector and the query feature vector exists may be performed. According to embodiments of the invention a match between the feature vector and the query feature vector may be considered when a certain level of similarity may be measured as indicated at box 470.

If there is a match, it may indicate that the object still appears in the scene and therefore the search may continue (e.g. to the next frame, or the next frame as defined by a sequence skipping certain frames) as indicated by arrow 485. By starting another iteration as indicated by arrow 485 along with setting the number of mismatches to zero, e.g., by setting a counter to zero as indicated at box 490.

If there is no match, it may indicate that the object may not appear in the scene and it may lead to detection of the first appearance of the object at the monitored scene. The counter of mismatches may be incremented by one as indicated at box 495 in order to save the number of the consecutive frames in which there is no match between the stream feature vector and the query feature vector and to allow comparing of the number of mismatches to a predefined threshold as indicated at box 500.

If the number of mismatches is lower than a predefined threshold, the search may be continued by starting iteration as indicated by arrow 505. A number of mismatches lower than a predefined threshold may imply that the detected object may be still exist in the monitored scene however for some reason it may not be detected in the specific frame, for example, someone or something may cover or hide the area of the detected object at or in the specific frame as shown in FIG. 3 by arrow 305.

Once the number of mismatches may reach a predefined threshold value, namely, once there number of consecutive mismatches between the decompressed stream feature vector and the query feature vector may reach a predefined threshold value as indicated at box 500, a decision regarding an absence of the detected object at or in the scene may be taken and a first appearance of the detected object may be stated as indicated at box 510.

Embodiments of the invention may include scanning or scanning back the video stream to find a frame in which the object first appears in the scene by counting a number of mismatches between the first and each one of the plurality of frames and comparing the number of mismatches to a predefined threshold. If the number of mismatches is higher than the predefined threshold, the first appearance of the object in the scene may be marked and if the number of mismatches is lower than the predefined threshold the query feature vector may be compared to the feature vector of a next frame.

Embodiments of the invention may support interactive search to leverage user feedback in the investigation process. Interim results may be presented that represent potential stopping points during the search, and on the fly may continue searching for a clear stopping point that may exhibit clear mismatch in the AOI in order to stop and display results. According to some embodiments of the invention, on each one of the plurality of the interim stopping points, the user may stop the search and may choose to play the results, before the system decides to stop it. The user may in addition choose to continue the search from the stopping point after the system had displayed the final result. In another embodiment of the invention, the user may choose one of the interim results and may change the selected AOI to initiate a new query. The search may be done either backwards or forward in time.

Although identification and verification of a static object in a crowded scene is presented as an exemplary embodiment, the invention is not limited in this regards and may be used in or with any other application or field such as, for example, baggage verification, vehicle verification, identification in a safe city or parking payments, asset protection and the like.

Embodiments of the invention propose a system and method for quick investigation and verification of an object. Once a person on the scene, e.g., a passenger, reports to a control room on the existence of a static object, an operator may investigate the relevant video source that covers the scene. In order to get the essential information about the circumstances of the object placement or abandonment, the operator may manually wrap the object by drawings a closed line or window on a screen using a user input device such as a mouse as shown in FIG. 5. The operator may initiate a quick search query on the video which may run backward on the video signal until it recognizes a significant change in the appearance of the segment wrapped by the drawn line. This may indicate the moment that the detected object was set in its position, e.g., before it was abandoned. A significant change in appearance may indicate the moment in time (and the frame) when the object arrived at or in the scene. In some cases, the object may still be near a person (not abandoned yet). The time period starting from the first appearance may be most interesting for an operator.

Embodiments may allow a user to re-do the same operation on the playback window if nested investigation is required. For example, a query may be set at 10:00:00. The system may returns a result such as: "the object first appears on the scene at 9:55:00". An operator may check the video starting 9:55:00 and may observe that at 9:54:59 a person that was occluding the object has moved and the object has been exposed to the camera. In this case, another query may be set starting from 9:54:59 backwards with the same area.

Embodiments of the invention may provide an important tool for on-the-fly quick investigation and verification on any video channel. Some embodiments are not limited to channels in which video analytics application may be permanently running on, which may produce essential information on the circumstances or object abandonment or placement. This information may be critical during a decision regarding a threat level. As embodiments of the invention may be performed interactively, on-the-fly and may focus on limited AOIs, e.g., a small image segment around the object rather than the whole field of view of the camera, only, the effectiveness may be significantly higher than automatic detection of objects.

While certain features of the invention have been illustrated and described herein, many modifications, substitutions, changes, and equivalents will occur to those of ordinary skill in the art. It is, therefore, to be understood that the appended claims are intended to cover all such modifications and changes as fall within the true spirit of the invention.

The invention claimed is:

1. A method for real-time investigation of objects detected in an area monitored by a closed circuit television (CCTV) system, the method comprising:
    receiving a plurality of video streams of the monitored area from one or more cameras;
    receiving by a computing device a query initiated by a user of the CCTV system upon becoming aware that a suspicious object is present in the monitored area, wherein the query includes an indication of an area of interest, marked by the user within a first frame of a video stream capturing the monitored area, wherein the area of interest includes an image of the suspicious object and the query is to scan the video streams backwards and identify a first appearance of the suspicious object in the video streams;
    automatically scanning one or more relevant video streams of the plurality of video streams backwards in time and analyzing the area of interest in previous frames;
    automatically identifying the first appearance of the suspicious object in a second frame, the second frame being previous in time to the first frame and wherein the second frame is from the one or more relevant video streams;
    and
    displaying to the user a playback of the video stream starting from the second frame or from a frame previous in time to the second frame so as to enable the real-time investigation of the suspicious object.

2. The method of claim 1, wherein initiating the query is based on a notification regarding the suspicious object received from a person present at the monitored area and the area of interest is determined based on the notification.

3. The method of claim 1, further comprising displaying the video stream backward starting from the second frame.

4. The method of claim 3, further comprising:
    receiving by the computing device an additional query initiated by the user of the CCTV system upon investigating the playback of the video stream, the additional query requesting searching backwards starting from a third frame that is previous in time to the second frame;
    automatically scanning one or more relevant video streams backward in time from the third frame and analyzing the area of interest in previous frames until another first appearance is found.

5. The method of claim 1, wherein automatically identifying the first appearance comprises:
    extracting a feature vector from the area of interest of a plurality of frames of the video stream;
    comparing the query feature vector to the feature vector of each of the plurality of frames;
    determining whether a mismatch exists between the first frame and each one of the plurality of frames and counting number of mismatches;
    comparing the number of mismatches to a predefined threshold;
    if the number of mismatches is higher than the predefined threshold marking a second frame as the first appearance of the object in the scene;
    if the number of mismatches is lower than the predefined threshold comparing the query feature vector to the feature vector of a next frame.

6. A video analytics system comprising:
    a plurality of cameras of a closed circuit television (CCTV) system;
    a data server to save a video stream of a monitored area recorded by the plurality of cameras;
    a computing device to:
        receive a plurality of video streams of the monitored area from the plurality of cameras;
        receive a query initiated by a user of the CCTV system upon becoming aware that a suspicious object is present in the monitored area, wherein the query includes an indication of an area of interest marked by the user within a first frame of the video stream, wherein the area of interest includes an image of the suspicious object and the query is to scan the video streams backwards and identify a first appearance of the suspicious object in the video streams;
        automatically scan one or more relevant video streams of the plurality of video streams backwards in time and analyzing the area of interest in previous frames;
        automatically identify the first appearance of the suspicious object in a second frame, the second frame being previous in time to the first frame and wherein the second frame is from the one or more relevant video streams;
    and
    an output device to display to the user a playback of the video stream starting from the second frame or from a frame previous in time to the second frame so as to enable the real-time investigation of the suspicious object.

7. The system of claim 6, further comprising:
    a communication element to transfer a notification regarding the suspicious object from a person present at the monitored area, wherein the area of interest is based on the notification.

8. The system of claim 6, wherein the computing device is further to extract a query feature vector from the area of interest of the first frame, extract a feature vector from the area of interest of a plurality of frames of the video stream to compare the query feature vector to the feature vector of each of the plurality of frames and to determine whether a mismatch between the first frame and each one of the plurality of frames exists.

9. The system of claim 6, wherein the computing device is to receive the area of interest from an input device.

10. The system of claim 6, wherein the data server is to compress the video stream and transfer a compressed video stream to the computing device.

11. The system of claim 6, wherein the computing device is to decompress a selected subset of the plurality of frames of the video stream.

12. An article comprising a non-transitory computer-readable storage medium, having stored thereon instructions, that when executed on a computer, cause the computer to:
- receive a plurality of video streams of a monitored area from one or more cameras;
- receive a query initiated by a user of a closed circuit television (CCTV) system upon becoming aware that a suspicious object is present in the monitored area, wherein the query includes an indication of an area of interest, marked by the user within a first frame of a video stream recorded at a capturing the monitored area, wherein the area of interest includes an image of the suspicious object and the query is to scan the video streams backwards and identify a first appearance of the suspicious object in the video streams;
- automatically scan one or more relevant video streams of the plurality of video streams backwards in time and analyzing the area of interest in previous frames;
- automatically identify the first appearance of the suspicious object in a second frame, the second frame being previous in time to the first frame and wherein the second frame is from the one or more relevant video streams; and
- display to the user a playback of the video stream starting from the second frame or from a frame previous in time to the second frame so as to enable the real-time investigation of the suspicious object.

* * * * *